R. P. BAIRD.
VEHICLE BRAKE.
APPLICATION FILED JULY 7, 1908.
921,788.
Patented May 18, 1909.
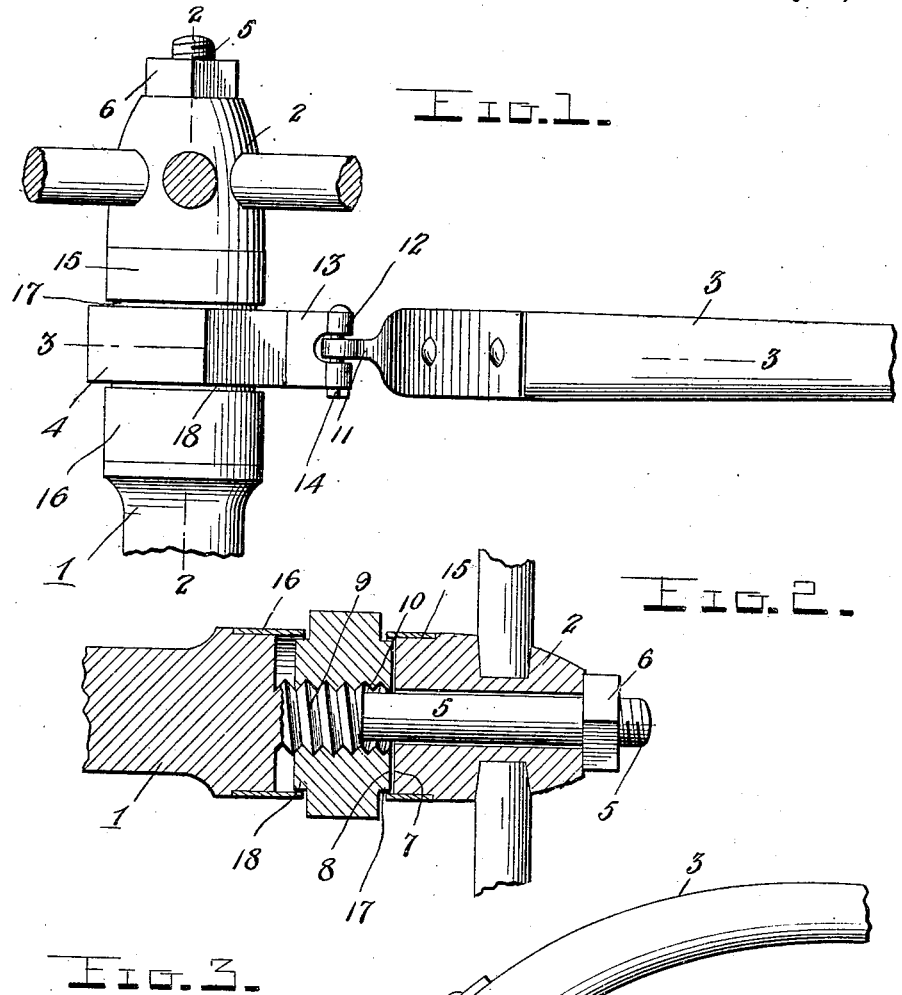
Witnesses
Chas. L. Griesbauer.
M. L. Skinner.
Inventor
R. P. Baird
By Watson E. Coleman
Attorney

UNITED STATES PATENT OFFICE.

ROBERT P. BAIRD, OF BERRY, KENTUCKY.

VEHICLE-BRAKE.

No. 921,788.      Specification of Letters Patent.      Patented May 18, 1909.

Application filed July 7, 1908. Serial No. 442,372.

*To all whom it may concern:*

Be it known that I, ROBERT P. BAIRD, a citizen of the United States, residing at Berry, in the county of Harrison and State of Kentucky, have invented certain new and useful Improvements in Vehicle-Brakes, of which the following is a specification, reference being had to the accompanying drawings.

This invention relates to improvements in automatic vehicle brakes and more particularly to a hub brake controlled by the shafts of a buggy, carriage or the like.

The object of the invention is to provide a device of this character which will be simple and comparatively inexpensive in construction and effective in operation.

With the above and other objects in view, the invention consists of the novel features of construction and the combination and arrangement of parts hereinafter fully described and claimed, and illustrated in the accompanying drawings, in which—

Figure 1 is a detail plan view of one end of an axle, a hub of a wheel and a portion of a shaft, illustrating the application of the invention; Figs. 2 and 3 are vertical sections taken, respectively, on the planes indicated by the lines 2—2 and 3—3 in Fig. 1; and Fig. 4 is a detail perspective of the brake block or shoe.

In the drawings 1 denotes a vehicle axle, 2 a wheel hub, 3 one of the shafts and 4 the improved brake block or shoe. The axle 1 is formed at its outer extremity with a reduced spindle 5 on which the hub 2 is rotatably mounted and retained by a nut 6 or any other suitable means. The inner end of the hub has a flat friction brake surface 7 to be engaged by a coacting friction brake surface 8 upon one end of the block 4, which latter is provided with a central opening having formed therein screw threads 9 of a large size and low pitch. These threads are adapted to engage similar threads 10 formed on an enlarged portion of the spindle 5 at its inner end. These screw threads are such that when the brake block 4 is turned in one direction its friction surface 8 will engage the friction surface 7 on the end of the hub to brake or check the rotation of the latter and when turned in the other direction said surface 8 will move away from the surface 7 to permit the wheel to run free. The brake block is actuated by the shaft 3, which latter has its rear end connected to it by providing an eye 11 upon the shaft to enter between spaced apertured lugs 12 formed upon an arm or projection 13 secured to the bottom of the block, a bolt or other removable fastening 14 being passed through the apertured lugs 12 and the eye 11 to pivotally or loosely unite the shaft to the brake block, as clearly shown in Figs. 1 and 3. In order to exclude dust and dirt from the spindle and the screw 10, projecting annular flanges 15, 16 are provided respectively, on the inner end of the hub and the large inner portion of the axle, said flanges being adapted to receive reduced cylindrical portions 17, 18 formed upon the opposite ends of the brake block 4 concentric with its opening, the friction surface 8 being upon the projection 17, as clearly shown in Fig. 4.

In operation, it will be seen that when the vehicle is being drawn forwardly by the animal hitched to the shaft 3 the brake block 4 will assume a position in which its brake surface 8 will be out of contact with the brake surface 7 upon the hub of the wheel, but the instant the animal holds back in descending a hill the brake block will be rotated on the axle and, owing to its screw threaded connection with the latter, it will be moved longitudinally in an outward direction so as to frictionally engage the hub and brake the movement of the buggy or other vehicle.

From the foregoing it will be seen that the invention is exceedingly simple in construction so that it may be produced at a small cost, will be strong and durable, and will be automatic and effective in operation.

Having thus described the invention what is claimed is:

1. The combination of an axle, a hub, a shaft, and a brake member connected to and actuated by the shaft and having a screw threaded engagement with the axle, whereby it will be moved longitudinally upon the same and into and out of frictional contact with the hub.

2. The combination of an axle having a spindle provided with a screw threaded portion at its inner end, a wheel hub upon the spindle, means for retaining the hub upon the spindle, a brake block having a threaded opening to engage the threads on the spindle, one end of said block being adapted to frictionally engage the inner end of the hub and a shaft connected to said brake block and adapted to actuate the same.

3. The combination of an axle having a spindle provided with a screw threaded portion at its inner end, a wheel hub upon the spindle, means for retaining the hub upon the spindle, inwardly extending annular flanges upon the inner end of the hub and the inner portion of the spindle, a brake block having a threaded opening to engage the screw threads on the spindle and provided at its ends with circular projections to enter the flanges on said hub and spindle, an arm projecting from said block and a shaft pivotally connected to said arm and adapted to actuate said brake block, substantially as described.

In testimony whereof I hereunto affix my signature in the presence of two witnesses.

ROBERT P. BAIRD.

Witnesses:
O. W. CONRAD,
S. P. BAIRD.